(12) United States Patent
Katou et al.

(10) Patent No.: US 7,780,384 B2
(45) Date of Patent: Aug. 24, 2010

(54) HOOK ATTACHING UNIT

(75) Inventors: Katsuhisa Katou, Aichi (JP); Katsunori Arai, Toyota (JP)

(73) Assignee: Aoyama Seisakusho Co., Ltd., Nagoya-Shi (JP)

( * ) Notice: Subject to any disclaimer, the term of this patent is extended or adjusted under 35 U.S.C. 154(b) by 946 days.

(21) Appl. No.: 11/552,569

(22) Filed: Oct. 25, 2006

(65) Prior Publication Data

US 2007/0102610 A1 May 10, 2007

(30) Foreign Application Priority Data

Nov. 4, 2005 (JP) ............................. 2005-320926

(51) Int. Cl.
*B60P 7/08* (2006.01)
(52) U.S. Cl. ...................... 410/102; 410/106; 410/109; 410/111; 410/112
(58) Field of Classification Search ................. 410/101, 410/102, 106, 107, 109, 111, 112; 24/115 K, 24/265 CD; 224/927, 313, 553; 296/1.08; 248/303, 304, 308, 322, 339, 294.1
See application file for complete search history.

(56) References Cited

U.S. PATENT DOCUMENTS

| | | | |
|---|---|---|---|
| 5,476,286 A | 12/1995 | Delfino | |
| 6,209,179 B1 | 4/2001 | Shou-Mao | |
| 6,213,696 B1 * | 4/2001 | Austin | ......................... 410/106 |

FOREIGN PATENT DOCUMENTS

| | | |
|---|---|---|
| GB | 28787 | 12/1907 |
| JP | 2000-316704 | 11/2000 |
| WO | WO 2006/063634 A1 | 6/2006 |

* cited by examiner

*Primary Examiner*—Stephen Gordon
(74) *Attorney, Agent, or Firm*—Burr & Brown

(57) ABSTRACT

A hook attaching unit in accordance with the invention is constituted by a hook member which is rotatably attached to an end portion of a base plate, a bolt with a flange inserted to a bolt insertion hole of the base plate, and a resin cover member in which a cover body is connected to an annular basement portion. Since the hook member, the cover member and the bolt are integrally assembled, it is not necessary to install the bolt separately in the work field and then install the cover member after attaching the hook, and as such, the workability at the time of fastening is improved. Further, since the cover member invisibly covers the bolt head portion, improved safety and outer appearance is obtained. The hook attaching unit can be also utilized for attaching a seat belt anchor plate.

6 Claims, 11 Drawing Sheets

HOOK ATTACHING UNIT

FIELD OF THE INVENTION

The present invention relates to a hook attaching unit for attaching a hook to a room inside of a motor vehicle.

BACKGROUND OF THE INVENTION

It is often the case that a hook for locking or attaching a clothes hanger, a cord of a shopping bag or the like is provided in a side surface in a space inside of a motor vehicle. As such a hook, in Japanese Unexamined Patent Publication No. 2000-316704, there is disclosed a structure in which a tubular base portion provided with a hook main body is attached to a panel by a bolt. However, in such a hook with this structure, a hole for locking a hook-shaped hooking device is formed in the hook main body, and a bolt head is visible through this hole. As a result thereof, an outer appearance is not good.

Further, since the hook and the bolt are not integrally assembled, there is a problem that workability is deteriorated at a time of attaching the hook in a motor vehicle assembling line.

Accordingly, an object of the present invention is to provide a hook attaching unit which has an improved outer appearance, and excellent workability for attaching a hook.

SUMMARY OF THE INVENTION

A hook attaching unit in accordance with the present invention for achieving the object mentioned above, is constituted by a hook member in which a hook is rotatably attached to an end portion of a base plate, a bolt inserted to a bolt insertion hole provided in the base plate, and a resin cover member installed to the base plate, so as to prevent the bolt from coming off from the base plate while covering the bolt head portion invisibly. As mentioned above, in the hook attaching unit in accordance with the present invention, since the hook member, the cover member and the bolt are integrally assembled, it is not necessary to install the bolt separately in the work field and then installing the cover member after attaching the hook, therefore the workability at a time of fastening is improved. Further, since the cover member invisibly covers the bolt head portion, improved safety and outer appearance is obtained.

In accordance with a preferable embodiment, the hook is formed by bending a metal wire, and the base plate is structured such that a protruding piece made of metal is provided in one end thereof and wound around the metal wire, while the hook is rotatably attached to the base plate. Accordingly, it is possible to rotatably attach the hook to the base plate. Further, since the hook and the base plate are made of the metal, durability against an impact force is obtained in comparison with a resin structure. Accordingly, it is possible to install a seat belt anchor plate as mentioned below.

In preferable, the hook is formed in a D shape, and end portions of the metal wire are faced to each other at an interval in a linear portion of the D-shaped portion, a protrusion piece is provided in a leading end of the protruding piece, and the protrusion piece is pushed into a gap so as to form a stopper inhibiting the hook from moving. Accordingly, it is possible to inhibit the hook from moving in a horizontal direction, and as such preventing the hook from injuring the cover member.

Further, the structure may be made such that the bolt is constituted by a flange bolt, and the cover member is constituted by an annular basement portion pressing a flange in a state in which the bolt head portion is protruded from a center window portion, and a cover body that is flexibly connected to an end portion of the basement portion so as to release the bolt head portion at a time of fastening the bolt and covering the bolt head portion after fastening the bolt. In accordance with the structure mentioned above, it is possible to install the bolt so as to prevent the bolt from unthreading from the hook member by pressing the flange with the annular basement portion. Further, since the cover body can be released from the bolt head portion at the time of fastening the bolt, the cover body does not create an obstacle to the fastening work.

Further, the structure may be made such that a short tube portion having an end surface is provided in a protruding manner around the bolt insertion hole of the base plate, and a stepped shaft portion protruding from the end surface is fitted into the short tube portion is provided below a neck of the bolt. Since it is possible to form a small gap between the end surface of the short tube portion and the spacer even at the time when the spacer is installed to the bolt so that it can be brought into contact with the step, it is possible to integrally rotate the bolt and the spacer without bringing the spacer into contact with the end surface. In this case, if the stepped shaft portion is protruded from the end surface of the short tube portion at a length capable of installing a seat belt anchor, it is possible to install the seat belt anchor to the short tube portion. Accordingly, it is possible to use one mounting unit in common for attaching the hook and the seat belt anchor plate, and there is an advantage that it is possible to reduce the number of parts while improving workability.

Further, if the bolt is provided with a spacer with a female thread for adjusting a height, it is possible to adjust the height by the spacer. Accordingly, an upper surface of the cover body neither protrudes from a panel plate surface of a vehicle body or is positioned at the depth.

BRIEF DESCRIPTION OF THE DRAWINGS

FIG. 10 is a cross sectional view of a state in which a seat belt anchor plate is installed.

DETAILED DESCRIPTION OF THE INVENTION

A description will be given below of a preferable embodiment in accordance with the present invention.

Figure 1:
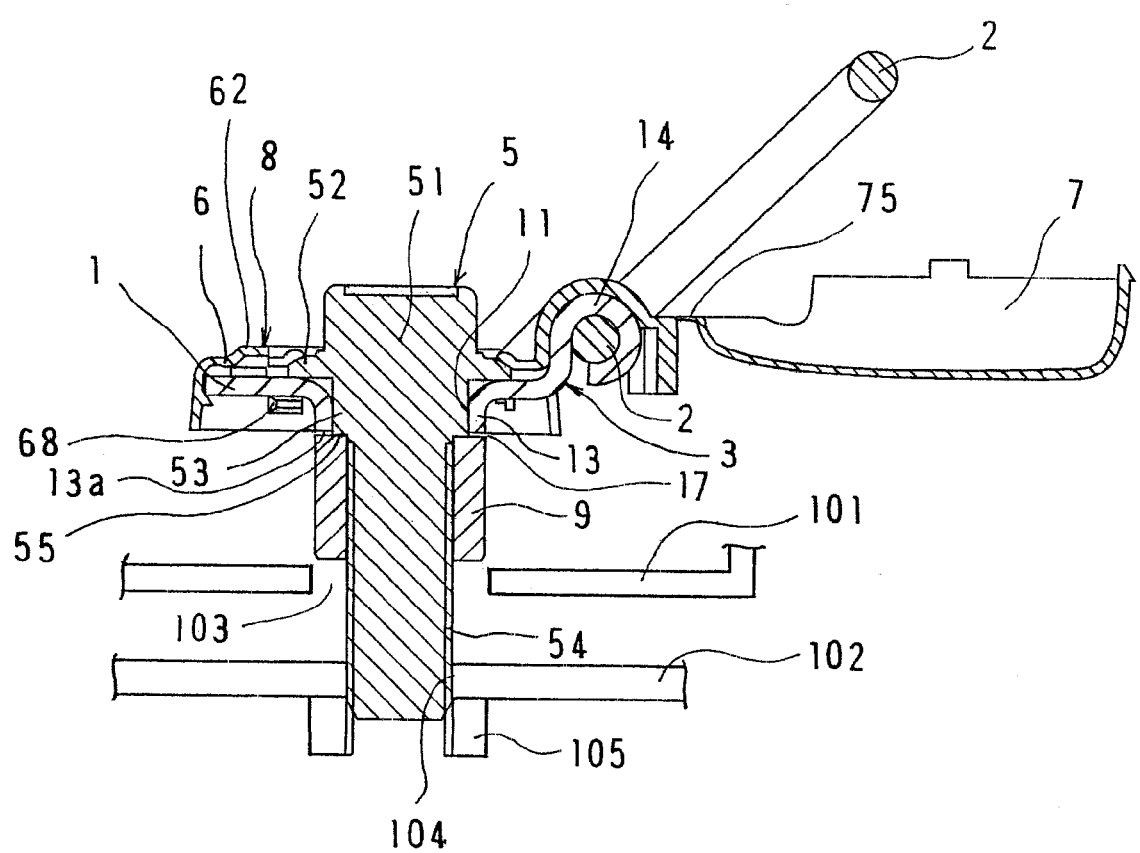
FIG. 1 is a cross sectional view of a hook attaching unit.
Figure 2:
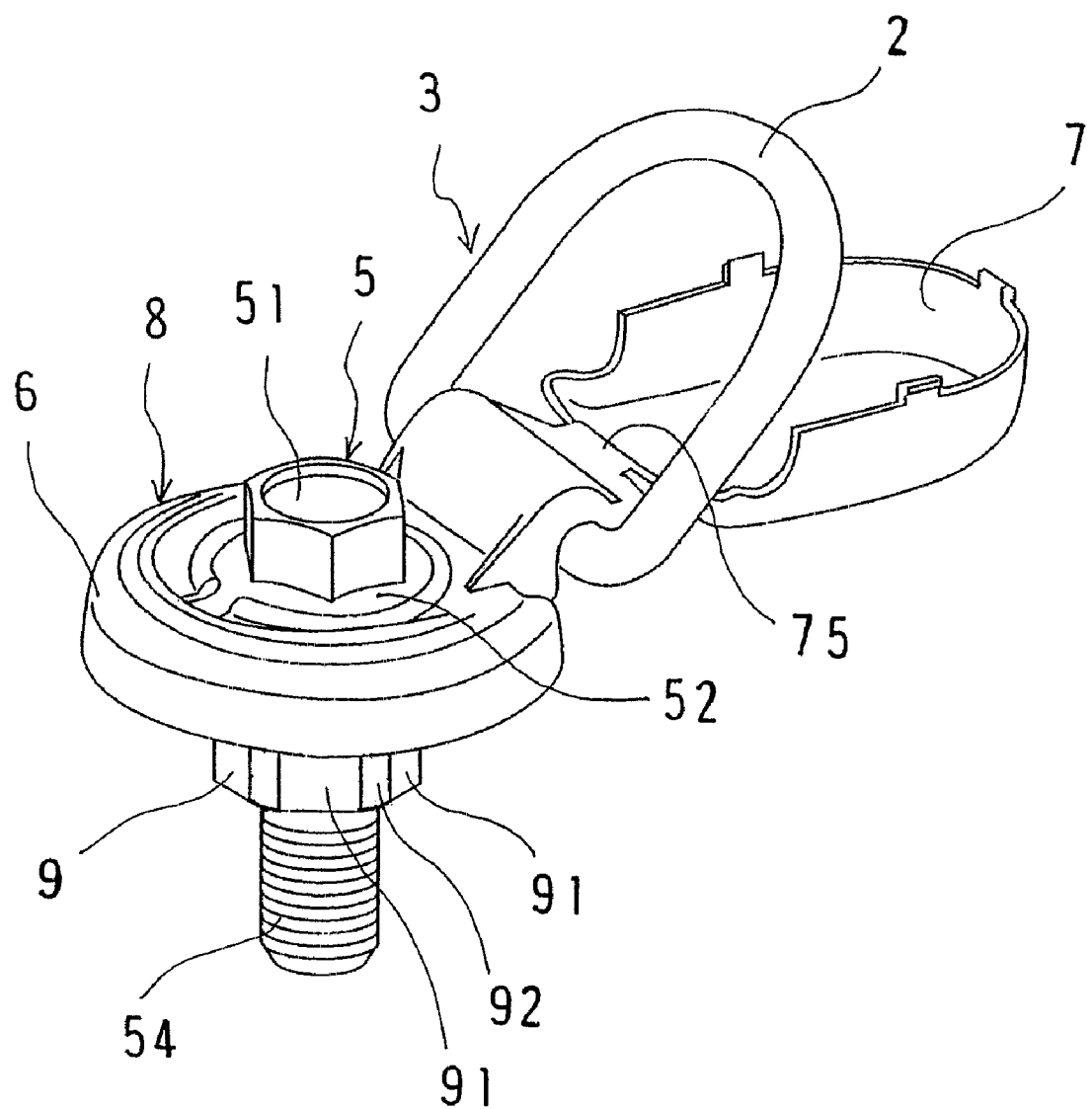
FIG. 2 is a perspective view of the hook attaching unit.

FIGS. 1 and 2 are views showing a hook attaching unit in accordance with the present invention. The unit is constituted by a hook member 3 in which a hook 2 is rotatably attached to an end portion of a base plate 1, a bolt 5 inserted to a bolt insertion hole 11 provided in the base plate 1, and a resin cover member 8 in which a cover body 7 is connected to an annular basement portion 6 installed to the base plate 1. A spacer 9 is screwed with the bolt 5.

Figure 3:
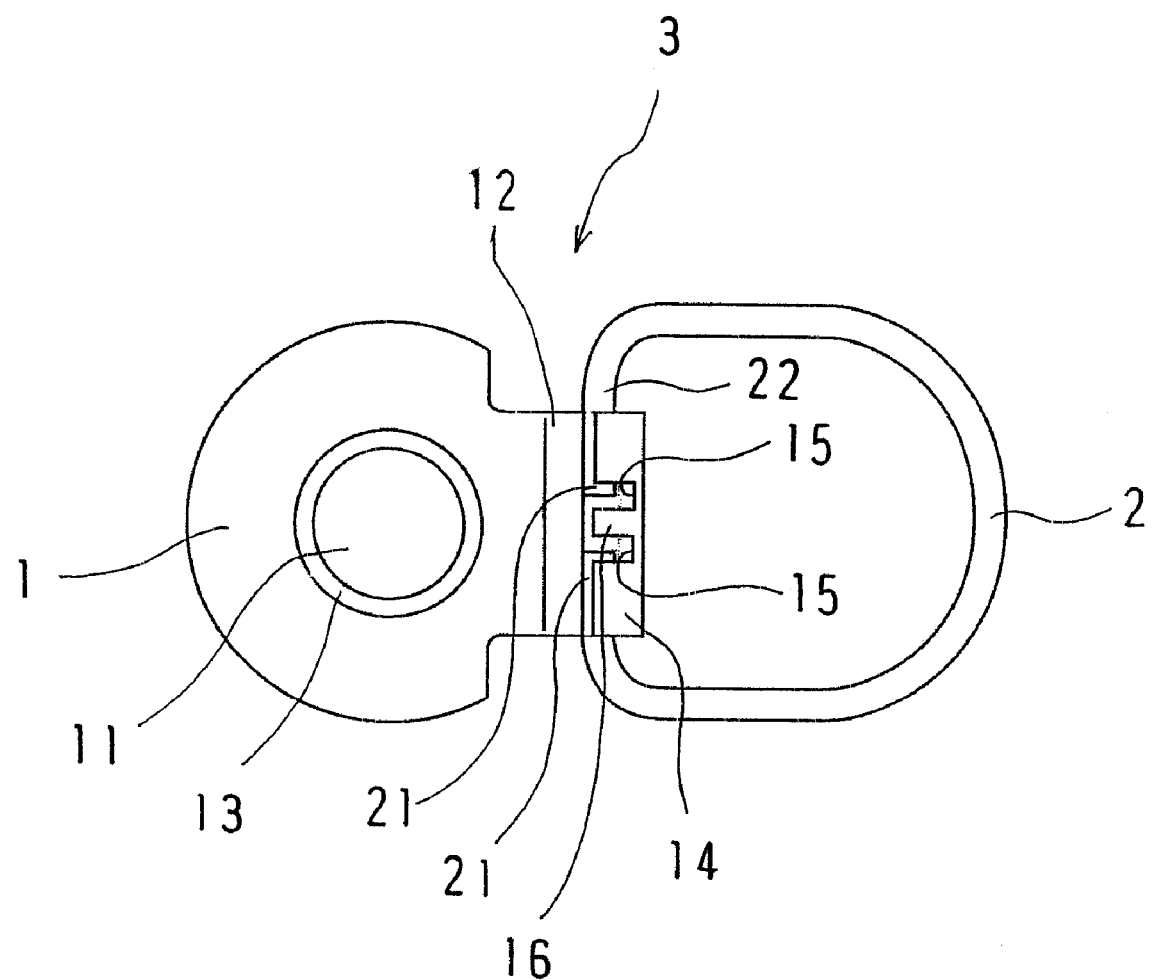
FIG. 3 is a bottom elevational view of a hook member.
Figure 4:
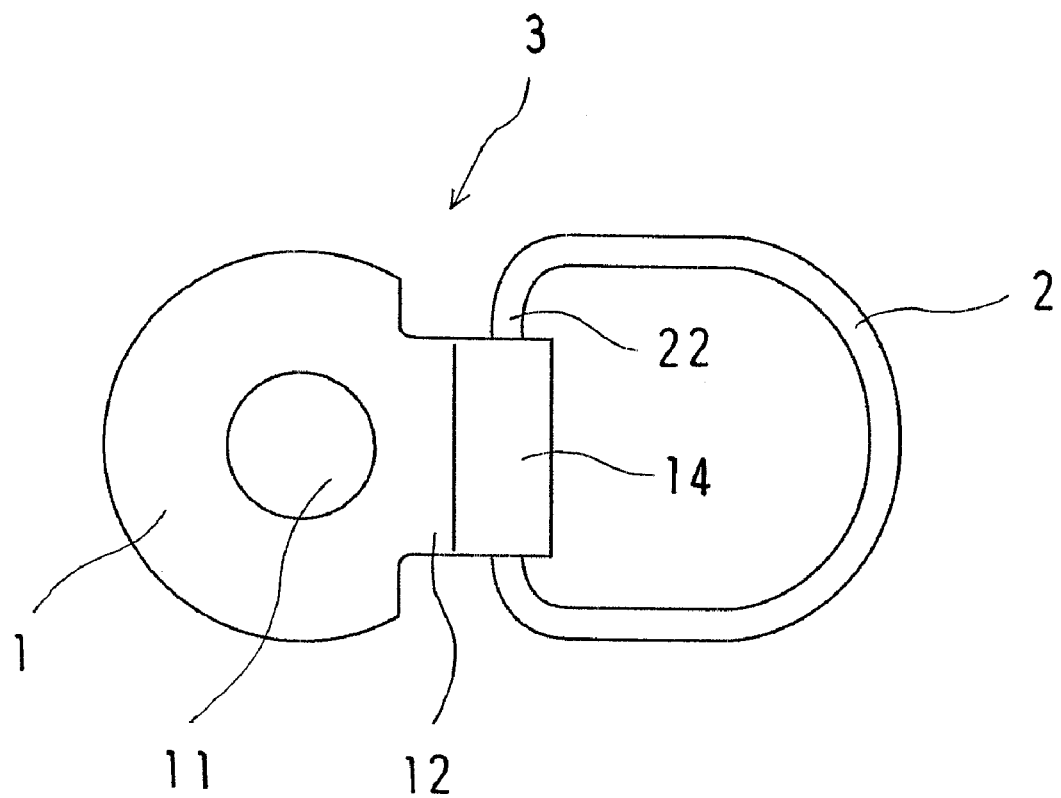
FIG. 4 is a plan view of the hook member.
Figure 5:
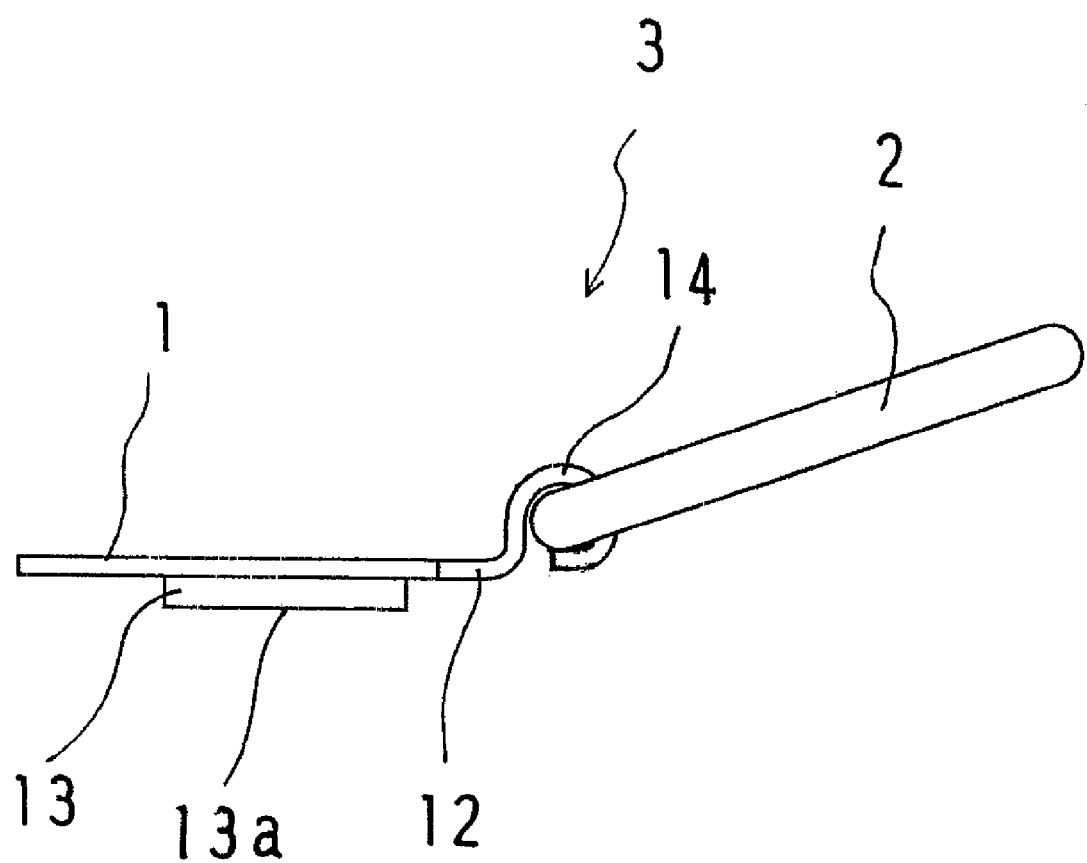
FIG. 5 is a front elevational view of the hook member.

FIGS. 3 to 5 are views showing details of the hook member 3. The bolt insertion hole 11 is formed in a center of the approximately circular base plate 1, and a protruding piece 12 is provided in an end portion thereof. The hook 2 is formed by bending a metal wire in a D shape, and end portions 21 of the metal wire face each other in a linear portion 22 of the D-shaped portion. Notches 15 for easily bending a leading end of the protruding piece 12 are formed at two positions of the protruding piece 12. Accordingly, the leading end of the protruding piece 12 is wound around the end portion 21 of the metal wire so as to form a tubular portion 14, and the hook 2 is rotatably attached to the base plate 1 by the tubular portion 14. A protrusion piece 16 is formed between the notches 15, and the protrusion piece 16 is folded and pressed between the facing end portions 21 of the metal wire, so as to be formed as a stopper for inhibiting the hook 2 from moving in an axial direction within the tubular portion 14. Accordingly, it is possible to prevent damage caused by a thrust of the hook 2 with the cover member 8 from a horizontal direction.

A short tube portion 13 is provided in a protruding manner around the bolt insertion hole 11 in such a manner as to protrude to a back side of the base plate 1 from the bolt insertion hole 11. The short tube portion 13 has an end surface 13a in an end portion thereof.

The bolt 5 has a head portion 51 formed in a hexagonal shape that engages with a tool, and a flange 52 peripherally provided in a lower portion of the head portion 51, as shown in FIGS. 1 and 2, and a shaft portion 53 with no threads fitted into the short tube portion 13 and no play is formed below a neck of the bolt 5, that is, in a lower side of the flange 52. The shaft portion 53 is formed so as to have a larger diameter than that of a male thread portion 54 of the bolt 5, also a step 55 protruding from the end surface 13a of the short tube portion 13 is provided at a time when the flange 52 is brought into contact with the base plate 1. Due to the step 55, it is possible to form a small gap 17 between the end surface 13a of the short tube portion 13 and the spacer 9 even when the spacer 9 is installed to the bolt 5 and brought into contact with the step 55, and as such it is possible to integrally rotate the bolt 5 and the spacer 9 without bringing the spacer 9 into contact with the end surface 13a.

Figure 6:
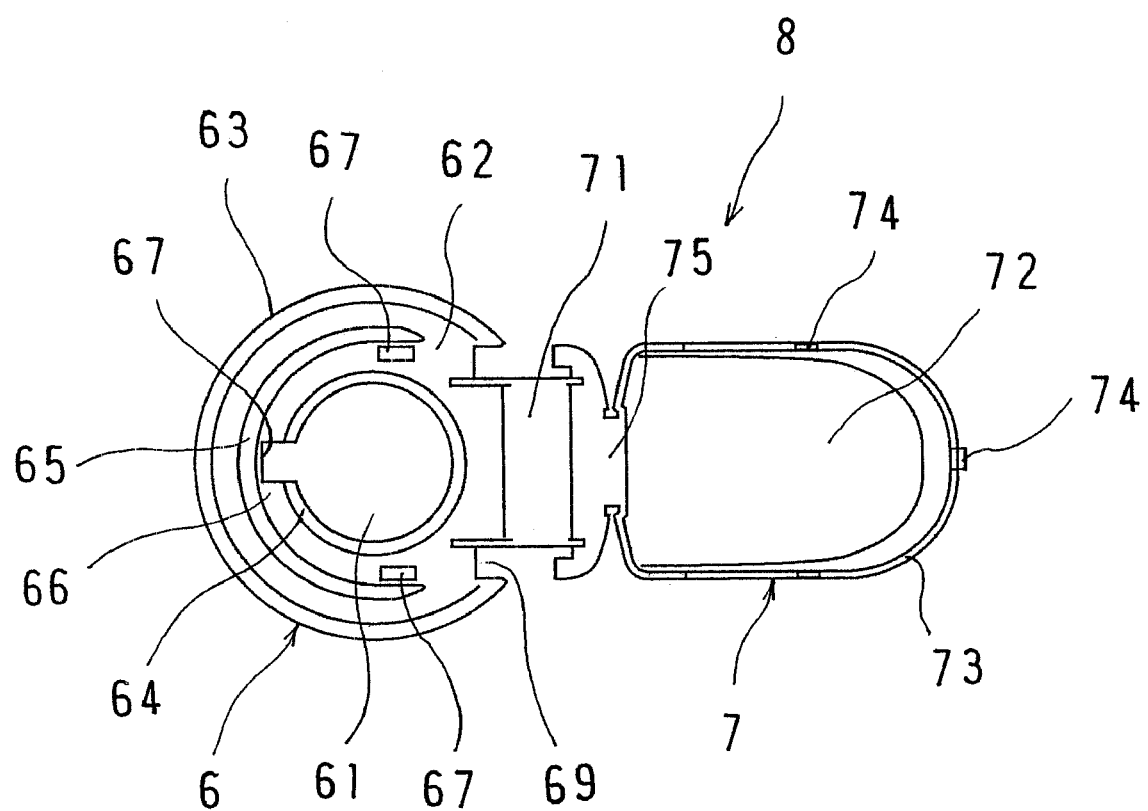
FIG. 6 is a plan view of a cover member.
Figure 7:
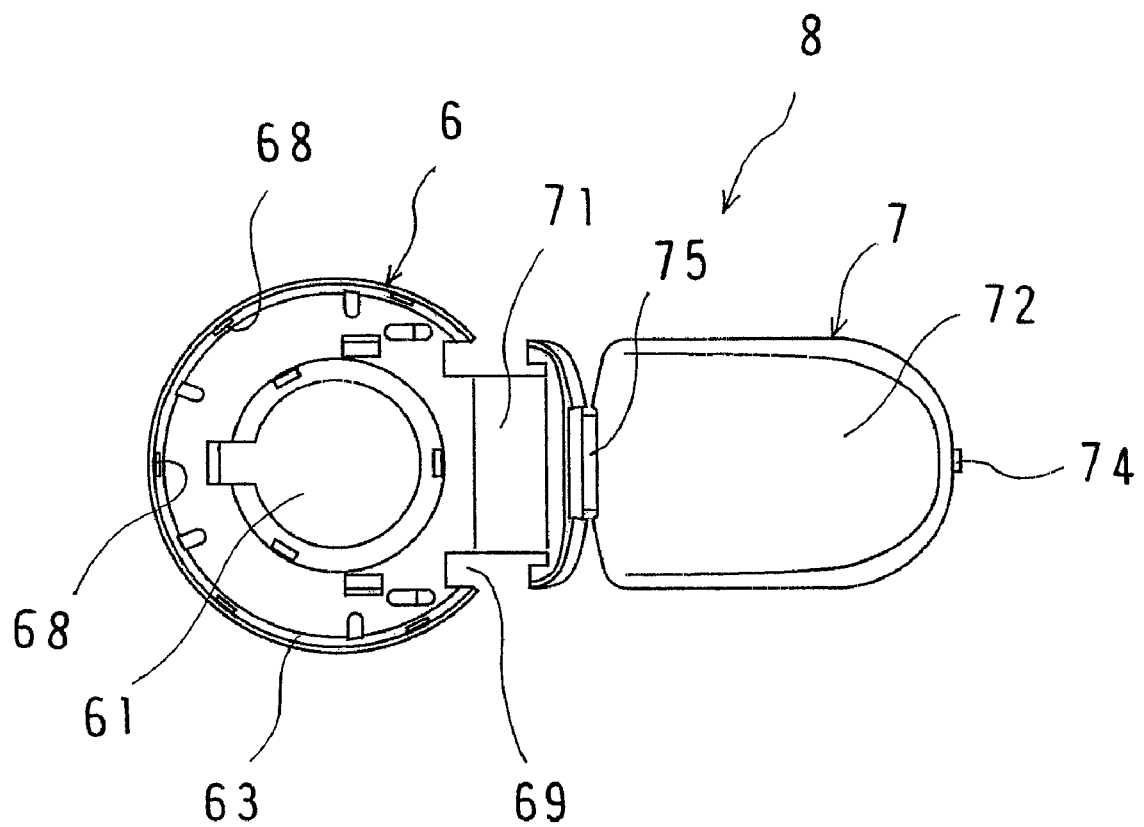
FIG. 7 is a bottom elevational view of the cover member.
Figure 8:
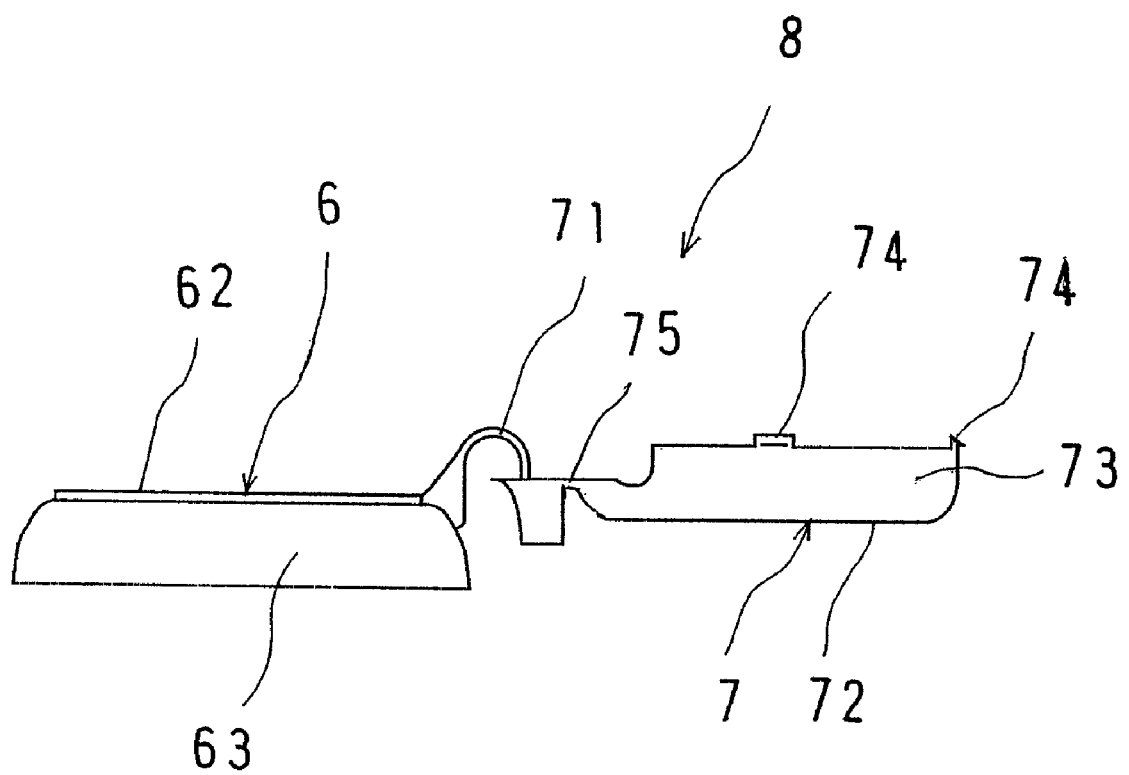
FIG. 8 is a front elevational view of the cover member.

Details of the cover member 8 will be shown in FIGS. 6 to 8. The cover member 8 is constituted by an annular basement portion 6 provided with a window portion 61 in the center, and a cover body 7 connected to an end portion of the basement portion 6 via a connection portion 71. The basement portion 6 has an approximately circular board portion 62 pressing the flange 52 in a state in which the bolt head portion 51 is protruded from the window portion 61, and a peripheral wall portion 63 provided in a handing manner in an outer periphery of the board portion 62. Further, the connection portion 71 is bent so as to cover the tubular portion 14 of the hook member 3.

The cover body 7 is provided with a cover plate portion 72 covering the bolt head portion 51, and a side wall 73 provided in a rising manner around the cover plate portion. An end portion of the wide wall 73 is provided with a locking pawl 74 for locking the cover body 7 covering the bolt head portion 51 to the basement portion 6. The cover body 7 is formed in an outer shape dimension which is opened and closed by a hinge 75 so as to be capable of passing through an inner side of the hook 2. Further, the board portion 62 is provided with a circular protuberance 64 going around the window portion 61, and a semicircular protuberance 65 formed to be spaced with respect to the circular protuberance 64, and a semicircular concave groove portion 66 formed between the circular protuberance 64 and the semicircular protuberance 65. An end portion of the side wall 73 is fitted to the concave groove portion 66, and the concave groove portion 66 is provided with a notch portion 67 engaging the locking pawl 74 so as to lock the cover body 7 when placed in a closed state.

An inner side of the peripheral wall portion 63 is provided with a locking hook 68 for attaching the cover member 8 to the base plate 1, and the locking pawl 74 is locked to an outer peripheral edge of the base plate 1. Further, a notch portion 69 is provided in the peripheral wall portion 63 in a lower side of the connection portion 71, whereby the peripheral wall portion 63 does not form an obstacle to the protruding piece 12 at a time of fitting the base plate 1 to the board portion 62.

In order to assemble the hook attaching unit in accordance with the present invention, as shown in FIG. 1, the bolt 5 is inserted to the bolt insertion hole 11 of the base plate 1 of the hook member 3, and the flange 52 is brought into contact with the base plate 1. Further, the base plate 1 is fitted to the inner portion of the basement portion 6 and locked, so that the bolt head portion 51 is protruded from the window portion 61 of the basement portion 6. Accordingly, since the board portion 62 presses the flange 52, it is possible to integrally assemble the hook member 3, the bolt 5 and the cover member 8. Further, the hook attaching unit with a spacer 9 can be obtained by screwing the spacer 9 having a female thread as the occasion demands or as needed.

Figure 9:
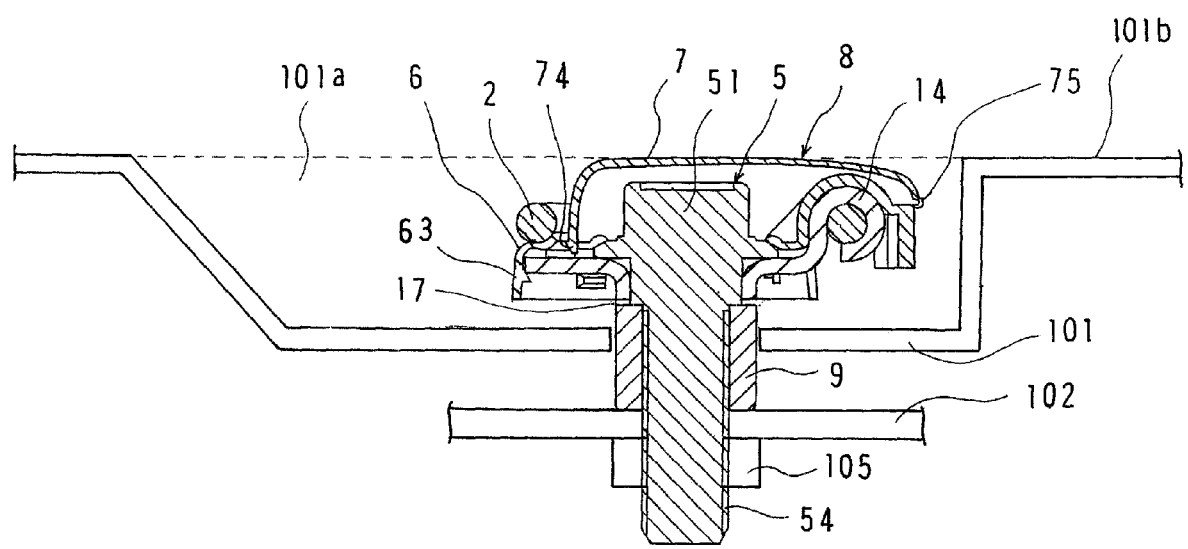
FIG. 9 is a cross sectional view showing an attached state of the hook attaching unit.
Figure 70:
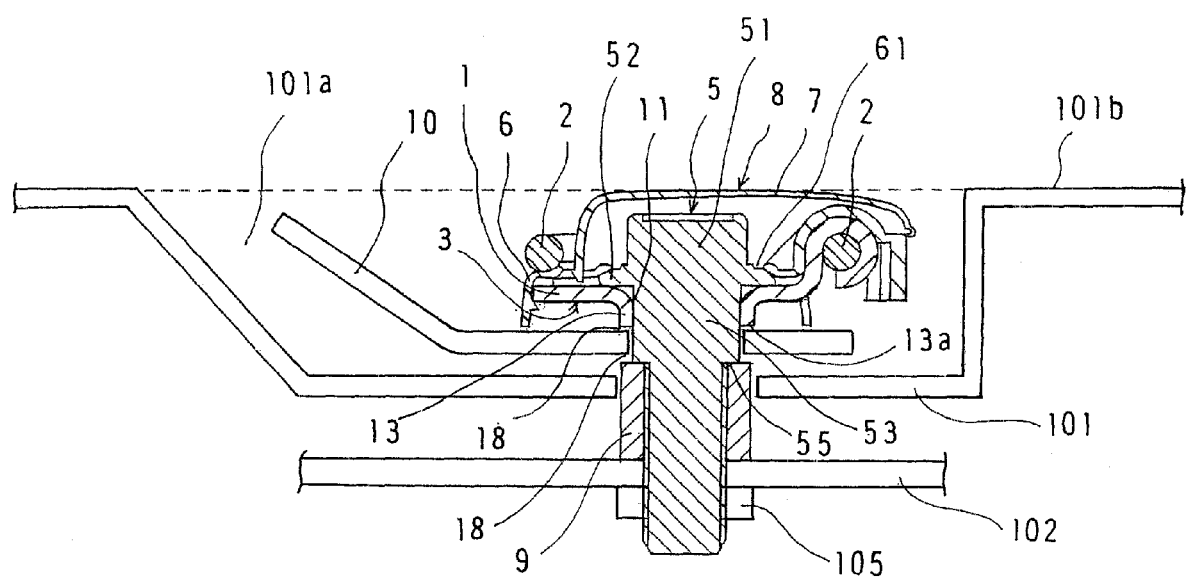

When attaching the hook attaching unit with the spacer as mentioned above to the side surface of a space inside of a motor vehicle, the bolt 5 is inserted to a prepared hole 103 of a concave portion 101a of a first panel (a trim) 101, and a leading end thereof is screwed with a nut 105 to be firmly attached to a prepared hole 104 of a second panel (an inner panel) 102. Further, when carrying on the rotation of the bolt 5, once the spacer 9 is seated on the second panel 102 as shown in FIG. 9, the fastening of the attaching unit is finished or completed. Thereafter, if the cover body 7 is weighed or pushed down in the direction of the bolt head portion 51, the locking pawl 74 is locked to the basement portion 6, and it is then possible to cover the cover body 7 on the bolt head portion 51. Since a length of the spacer 9 is adjustable, the upper surface of the cover body 7 can be positioned on the same surface as a plate surface 101b of the first panel 101.

Since the spacer 9 is structured, as shown in FIG. 2, such that a flat surface 91 and a circular arc surface 92 are formed in a side surface to be spaced, the outer diameter of the circular arc surface 92 is set equal to an outer diameter of the short tube portion 13, and the spacer 9 can easily pass through the prepared hole 103 of the first panel 101 together with the short tube portion 13.

In this case, it is possible, to accommodate the hook 2 by rotating the hook 2 to an upper side of the basement portion 6 as shown in FIG. 9 at a time when the hook 2 is not used. When the hook 2 is used, the hook 2 is used by rotating so as to detach it from the basement portion 6.

FIG. 10 shows an embodiment in which the hook attaching unit is used for attaching the seat belt anchor 10. In this embodiment, the shaft portion 53 is set to a length capable of installing the seat belt anchor plate 10, that is protruded from the end surface 13a of the short tube portion 13. Since a protruding length is set slightly longer than a thickness of the seat belt anchor plate 10, a play 18 is formed in upper and lower surfaces of the seat belt anchor plate 10 and it is possible to flexibly tilt the seat belt anchor plate 10 at the time of installing the seat belt.

Figure 11:
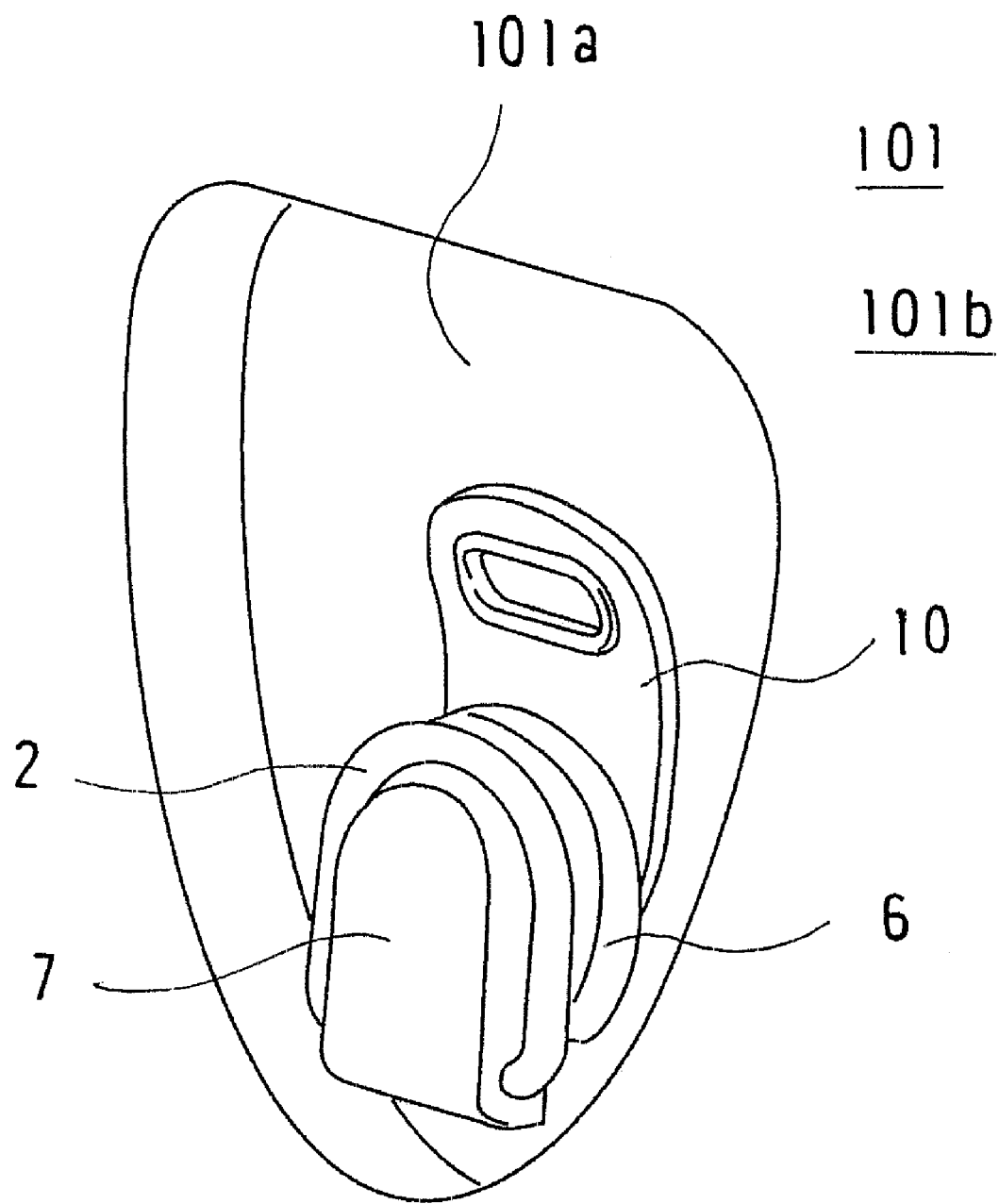
FIG. 11 is a perspective view of a state in which the seat belt anchor plate is fixed to a concave portion of a trim.

Even in this case, the length of the spacer 9 is adjusted in such a manner that the upper surface of the cover body 7 is positioned on the same surface as the plate surface 101b of the first panel 101. Accordingly, as shown in FIG. 11, the cover body 7 can be attached to the first panel 101 without protruding from the concave portion 101a.

As mentioned above, the hook attaching unit in accordance with the present invention can also be utilized for installing the seat belt anchor plate 10. Since the attachment of the hook and the attachment of the seat belt anchor plate have conventionally been achieved by the independent attaching members, both the number of parts and the cost is increased. However, it is possible to reduce the number of parts and achieve a cost reduction on the basis of the present invention.

The invention claimed is:

1. A hook attaching unit comprising:
   a hook member in which a hook is rotatably attached to an end portion of a base plate;
   a bolt inserted through a bolt insertion hole provided in the base plate; and
   a resin cover member installed on the base plate so as to prevent the bolt from coming off from the base plate and so as to cover a head portion of the bolt,
   wherein the cover member comprises an annular basement portion having a center window through which the bolt head portion protrudes, and a cover body flexibly connected to an end portion of the basement portion so as to expose the bolt head portion at a time of fastening the bolt and cover the bolt head portion after fastening the bolt.

2. The hook attaching unit as claimed in claim 1, wherein the hook is formed by bending a metal wire, and the base plate is structured such that a protruding piece made of a metal and provided in one end thereof is wound around the metal wire, and the hook is rotatably attached to the base plate.

3. The hook attaching unit as claimed in claim 2, wherein the hook is formed in a D shape, and end portions of the metal wire are faced to each other at an interval in a linear portion of a D-shaped portion, a protrusion piece is provided in a leading end of the protruding piece, and the protrusion piece is pushed into a gap so as to form a stopper for inhibiting the hook from moving.

4. The hook attaching unit as claimed in claim 1, wherein a short tube portion having an end surface is provided in a protruding manner around the bolt insertion hole of the base plate, and a stepped shaft portion protruding from the end surface at a time of being fitted into the short tube portion is provided below a neck of the bolt.

5. The hook attaching unit as claimed in claim 4, wherein the stepped shaft portion is protruded from the end surface of the short tube portion at a length capable of installing a seat belt anchor.

6. The hook attaching unit as claimed in claim 1, wherein the bolt is provided with a spacer with a female thread for adjusting a height.

\* \* \* \* \*